United States Patent
Toda et al.

[11] Patent Number: 6,003,957
[45] Date of Patent: Dec. 21, 1999

[54] FLUID PRESSURE CONTROL APPARATUS FOR WHEEL BRAKES

[75] Inventors: Hiroshi Toda; Hirochika Shibata, both of Kariya; Tadao Saito, Nagoya, all of Japan

[73] Assignee: Aisin Seiki Kabushiki Kaisha, Kariya, Japan

[21] Appl. No.: 08/907,952

[22] Filed: Aug. 11, 1997

[30] Foreign Application Priority Data

Aug. 27, 1996 [JP] Japan ..................................... 8-225733

[51] Int. Cl.⁶ ........................................................ B60T 8/00
[52] U.S. Cl. ..................... 303/10; 303/116.1; 303/119.1; 303/900; 303/113.2
[58] Field of Search ................................ 303/900, 10–12, 303/193, 901, 68, 113.1–119.3, DIG. 1, DIG. 2, 125, 139, 188, 189, 187, 186

[56] References Cited

U.S. PATENT DOCUMENTS

| | | | |
|---|---|---|---|
| 4,844,558 | 7/1989 | Ishii et al. | 303/119.1 |
| 4,900,102 | 2/1990 | Jonner et al. | 303/113.2 |
| 4,988,148 | 1/1991 | Farr et al. | 303/116.1 |
| 5,242,216 | 9/1993 | Miyawaki et al. | 303/119.2 |
| 5,322,352 | 6/1994 | Ohno et al. | |
| 5,393,132 | 2/1995 | Yogo et al. | 303/116.1 |
| 5,549,366 | 8/1996 | Toda et al. | 303/901 |

FOREIGN PATENT DOCUMENTS

| | | |
|---|---|---|
| 5-65388 | 9/1993 | Japan . |
| 7-35221 | 6/1994 | Japan . |
| 6-199215 | 7/1994 | Japan . |

*Primary Examiner*—Douglas C. Butler
*Attorney, Agent, or Firm*—Burns, Doane, Swecker & Mathis, LLP

[57] ABSTRACT

The present invention aims to provide a fluid pressure control apparatus which allows the gradient of pressure increase to be adjusted finely without using any accumulator. The fluid pressure control apparatus of the present invention includes a hydraulic pump driven by a drive motor and a wheel brake. A first orifice is provided in a passage portion on the side of an outlet of the hydraulic pump. Another passage portion on the side of an inlet of the hydraulic pump is connected to the passage portion between the first orifice and the hydraulic pump through a return passage. A switching valve and a second orifice are connected in series along the return passage. The pressure increase gradient can be set to a small value by changing the amount of fluid flowing into the wheel brake. This is effected, for example, by changing the ratio of the fluid passage area of the first orifice to that of the second orifice, the operational speed of the hydraulic pump, or the duty ratio of the switching valve.

8 Claims, 3 Drawing Sheets

FLUID PRESSURE CONTROL APPARATUS FOR WHEEL BRAKES

INCORPORATION BY REFERENCE

The entire disclosure of Japanese Unexamined Patent Application No. HEI 8-225733 filed on Aug. 27, 1997 including specification, drawings and abstract is incorporated herein by reference in its entirety.

BACKGROUND OF THE INVENTION

1. Field of the invention

The present invention relates to a fluid pressure control apparatus for wheel brakes, more specifically, to a fluid pressure control apparatus which generates a braking force by supplying a fluid pressure generated by a pressure source to a wheel brake based on information representative of a driving state of a vehicle detected by a wheel speed sensor or a distance sensor. The fluid pressure control apparatus of the present invention is especially used to keep the vehicle away from a preceding vehicle by a certain distance.

The construction of a conventional fluid pressure control apparatus varies in many respects. According to a conventional foot-operated braking apparatus, a fluid pressure generated in a master cylinder is supplied to a wheel brake upon depression of a brake pedal. However, the fluid pressure control apparatus disclosed, for example, in Japanese Patent Application Laid-Open No. HEI 6-199215 or Japanese Utility Model Laid-Open No. HEI 7-35221 automatically supplies a fluid pressure generated by a pressure source other than the master cylinder to the wheel brake, regardless of whether the brake pedal is depressed or not.

In the above-mentioned fluid pressure control apparatus, an automatic braking actuator is installed such that a brake fluid supplied from the master cylinder and that supplied from the pressure source flow through the same passage. The pressure source includes a pump driven by a drive motor and an accumulator for accumulating a fluid-pressure generated by the pump. When the automatic braking process is triggered, the fluid pressure accumulated in the accumulator is supplied to the automatic braking actuator.

Since this fluid pressure control apparatus necessitates a relatively bulky accumulator as a pressure source, it is disadvantageous in terms of installation.

Another fluid pressure control circuit disclosed in Japanese Published Patent No. HEI 5-65388 employs a pump as a pressure source and ensures a sufficient fluid pressure without using the accumulator. However, this fluid pressure control circuit is only capable of generating a fluid pressure required for traction control (TRC). This fluid pressure control circuit allows the entire amount of fluid discharged by the pump to be supplied to the wheel brake, and thus is unsuitable for control processes in which a gradient of pressure increase has to be finely adjusted in accordance with the circumstances surrounding the vehicle.

For this purpose, a variable capacity pump may be used. However, the use of the variable capacity pump is equally unsuitable because it has a substantially complicated structure, is very expensive, and requires a space almost as large as that for accommodating an accumulator.

2. Description of the Related Art

SUMMARY OF THE INVENTION

It is thus an object of the present invention to provide a fluid pressure control apparatus that allows the pressure increase gradient to be adjusted finely without necessitating any accumulator and thereby meets the requirements of the automatic braking process.

The present invention has been made to achieve the above-mentioned object. According to a first aspect of the present invention, there is provided a fluid pressure control apparatus including a hydraulically operated wheel brake, a hydraulic pump, a first orifice, a return passage, a second orifice and an switching valve. The hydraulic pump is driven by a drive motor to supply the fluid pressure to the wheel brake. The first orifice is provided in a passage portion on the side of an outlet of the hydraulic pump. The return passage connects a passage portion between the first orifice and the hydraulic pump to another passage portion on the side of an inlet of the hydraulic pump. The second orifice is provided in the return passage. The switching valve selectively opens or closes the return passage.

When the hydraulic pump is operated with the switching valve provided in the return passage closed, the entire amount of fluid discharged by the hydraulic pump flows through the first orifice, thus increasing the fluid pressure applied to the wheel brake. On the other hand, when the hydraulic pump is operated with the switching valve open, the fluid discharged by the hydraulic pump flows through two different paths, that is, a first path and a second path. More specifically, some of the fluid flows through the first orifice and thereby increases the fluid pressure applied to the wheel brake, while the remainder of the fluid flows back into the inlet of the hydraulic pump through the second orifice and thus does not contribute to the increase in the fluid pressure applied to the wheel brake. In this case, the ratio of the flow rate of the first path to that of the second path corresponds to the ratio of the fluid passage area of the first orifice to that of the second orifice. By changing this ratio, the amount of fluid contributing to the pressure increase can be determined. In other words, the flow rate of the fluid flowing through the first path can be adjusted by changing the operational speed of the hydraulic pump or by selectively opening or closing the above-mentioned switching valve. For example, when the hydraulic pump is operated at high speed with the switching valve closed, the flow rate of the fluid flowing through the first path is increased, thus increasing the fluid pressure applied to the wheel brake rapidly. On the other hand, when the hydraulic pump is operated at low speed with the switching valve open, the flow rate of the fluid flowing through the first path is reduced, thus increasing the fluid pressure applied to the wheel brake gradually. In particular, when the switching valve is open, the flow rate of the fluid flowing through the first path is decreased stepwise every time the hydraulic pump performs a fluid-discharging operation. Accordingly, the pressure increase gradient can be adjusted finely by setting a change in this flow rate caused by one single fluid-discharging operation of the hydraulic pump to a small value. It is also possible herein to selectively open or close the above-mentioned switching valve without changing the operational speed of the hydraulic pump.

According to a second aspect of the present invention, there is provided a fluid pressure control apparatus including a hydraulically operated wheel brake, a master cylinder, a fluid pressure control valve unit, a hydraulic pump, an inlet passage, first and second orifices, primary, secondary and return passage switching valves, and a return passage. The master cylinder generates a fluid pressure corresponding to a depressing force applied to a brake pedal and supplies the fluid pressure to the wheel brake. The fluid pressure control valve unit shuts off a fluid pressure supply from the master cylinder to the wheel brake to cause fluid to flow from the wheel brake into a reservoir. The hydraulic pump causes fluid to flow from the reservoir into a passage portion between the fluid pressure control valve unit and the master cylinder. The hydraulic pump is driven by a drive motor. The inlet passage connects an inlet of the hydraulic pump either to the master cylinder or to a master cylinder reservoir connected thereto. The primary switching valve selectively opens or closes the inlet passage. The secondary switching valve is provided between the master cylinder and the fluid pressure control valve unit and located closer to the master cylinder than a passage portion into which a fluid discharged by the hydraulic pump flows. The first orifice is provided in a passage portion on the side of an outlet of the hydraulic pump. The return passage connects a passage portion between the first orifice and the hydraulic pump to a passage portion on the side of an inlet of the hydraulic pump. The second orifice is provided in the return passage. The return passage switching valve selectively opens or closes the return passage.

This construction enables a hydraulic pump for ABS control to be utilized to operate the automatic braking apparatus. By adding the first and second orifices to the ABS control circuit, a fluid pressure control circuit capable of performing ABS control, automatic braking and traction control altogether can be realized.

DETAILED DESCRIPTION OF PREFERRED EMBODIMENTS

Hereinafter, preferred embodiments of the present invention will be described in detail with reference to the accompanying drawings.

Figure 1:
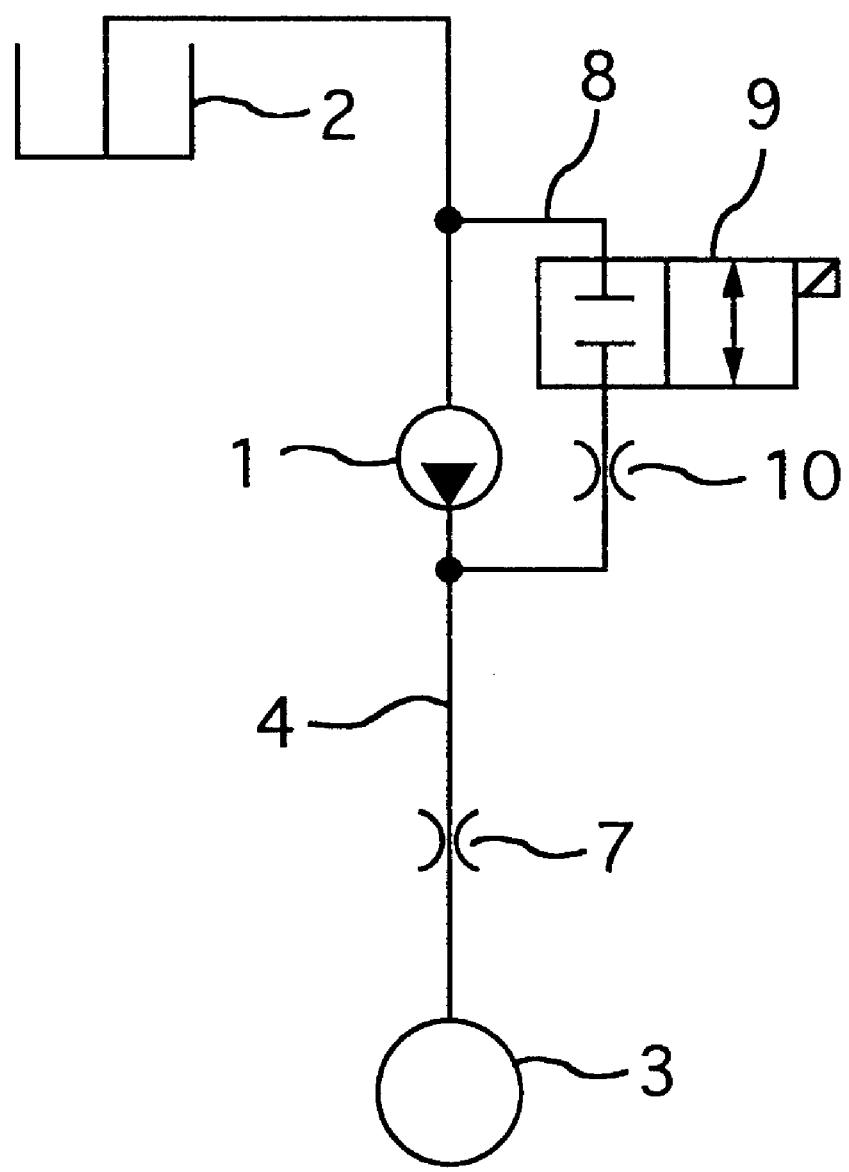
FIG. 1 is a circuit diagram showing a basic construction of the fluid pressure control apparatus for wheel brakes according to the present invention.

Referring to FIG. 1, it is apparent that reference numeral 1 denotes a hydraulic pump for a braking apparatus of a vehicle. The hydraulic pump 1 is interposed between a reservoir 2 and a wheel brake 3 and connected thereto through a passage 4. The hydraulic pump 1 is designed to suck fluid from the reservoir 2 and force it into the wheel brake 3. Thus, the fluid enters an inlet of the hydraulic pump 1 and comes out of an outlet thereof. There are provided check valves at the both inlet and outlet sides of the hydraulic pump 1, one of which prevents the fluid from flowing in a direction from the hydraulic pump 1 to the reservoir 2, the other of which prevents the fluid from flowing in a direction from the wheel brake 3 to the hydraulic pump 1.

A first orifice 7 for flow rate control is provided between the wheel brake 3 and the hydraulic pump 1. The reservoir 2 and the outlet side of the hydraulic pump 1 are connected to each other through a return passage 8 which allows fluid to flow from the hydraulic pump 1 to the reservoir 2. An electromagnetic solenoid operated switching valve 9 and a second orifice 10 are connected in series along the return passage 8.

In the above-described fluid pressure control apparatus, a gradient of pressure increase can be set arbitrarily by adjusting the flow path areas of the first and second orifices 7, 10, a timing for opening or closing the switching valve 9, or an operating speed of the hydraulic pump 1. The fluid pressure control apparatus is thus capable of performing a braking operation suitably, to keep the vehicle away from a preceding vehicle by a certain distance or avoid possible collision therewith in case of emergency.

When the fluid pressure control apparatus is activated, to increase a fluid pressure applied to the wheel brake 3, the hydraulic pump 1 starts to operate at high speed with the switching valve 9 closed. The entire amount of fluid forced by the hydraulic pump 1 at this time flows through the first orifice 7 and reaches the wheel brake 3, thus increasing the pressure applied to the wheel brake 3 rapidly. When the operational speed of a wheel has dropped sufficiently, the operating speed of the hydraulic pump 1 is reduced. If there is a tendency of the wheel being locked, the operation of the hydraulic pump 1 is terminated or the switching valve 9 is opened.

In executing a control to keep the vehicle away from a preceding vehicle by a certain distance, the gradient of pressure increase needs to be adjusted flexibly in dependence on the surrounding situations. In this case, for example, the switching valve 9 is closed before a predetermined length of time passes upon start of a braking process. When the operational speed of the wheel brake 3 has dropped sufficiently, the switching valve 9 is opened. This makes part of the fluid (QA) flow through the first orifice 7 and reach the wheel brake 3, and the remainder of the fluid (QB) flow through the second orifice 10 and return either to the reservoir 2 or to the hydraulic pump 1. However, most of the fluid flows through the return passage 8 at the end of the braking process because the pressure applied to the wheel brake 3 is almost as large as that of the fluid discharged by the hydraulic pump 1. The gradient of pressure increase becomes small at the end of the braking process, thus offering a desirable condition for an automatic braking process.

The switching valve 9 may remain opened throughout the process if it is desired to minimize the gradient of pressure increase.

An embodiment in which the above-described fluid pressure control apparatus is employed in ABS system will now be described with reference to FIG. 2.

Figure 2:
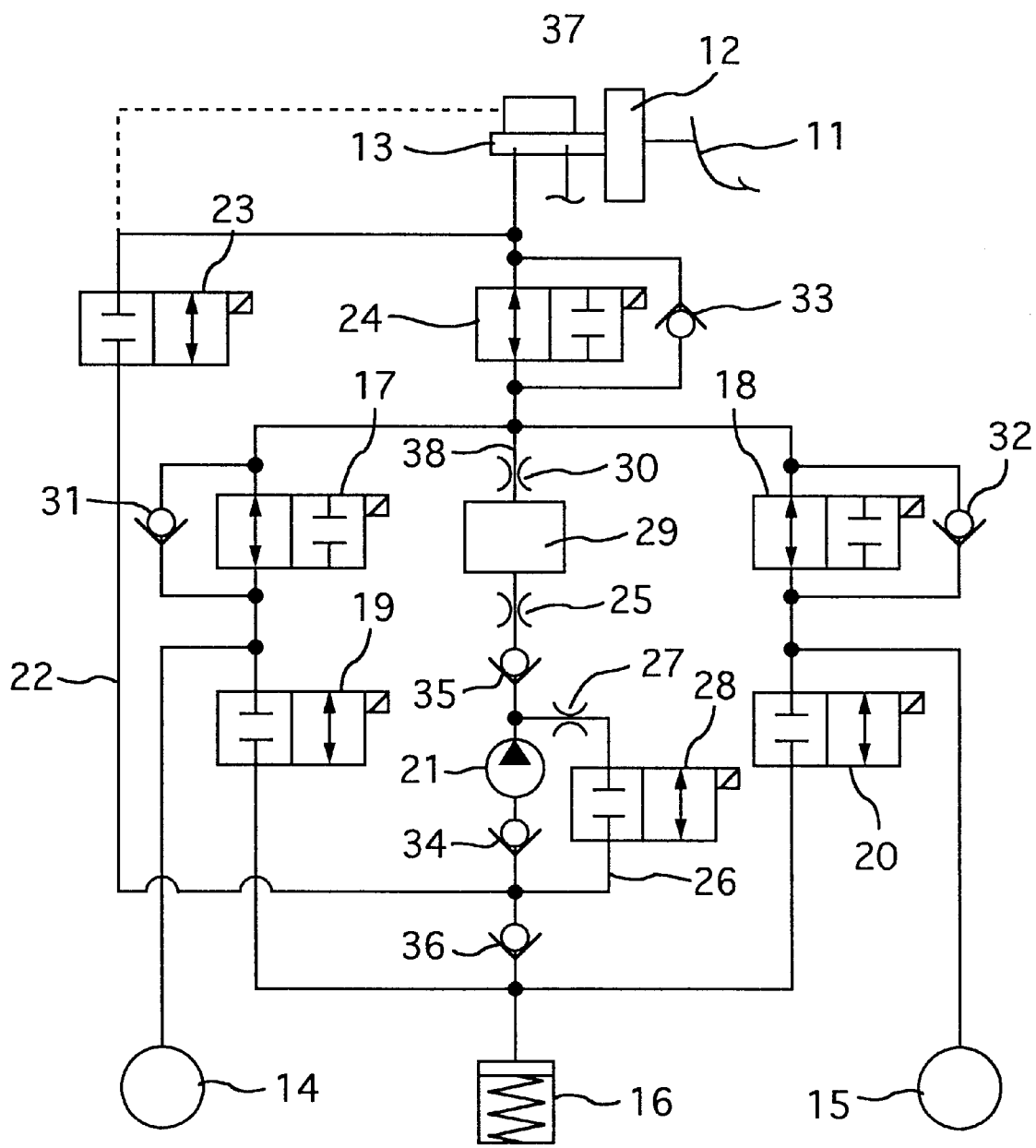
FIG. 2 is a circuit diagram showing one embodiment of the fluid pressure control apparatus according to the present invention.

FIG. 2 shows only one of the two fluid pressure systems constituting the fluid pressure control apparatus of the present invention. Wheel brakes 14, 15 may be mounted to a front left wheel and a front right wheel respectively, or to a rear front wheel and a rear right wheel respectively. Alternatively, in the case of a front-engine-front-drive vehicle, the wheel brakes 14, 15 may be mounted to the front left wheel and the rear right wheel respectively, or to the front right wheel and the rear left wheel respectively. As shown in FIG. 2, a brake pedal 11 is connected through a booster 12 to a tandem master cylinder 13 which has two pressure generation chambers. Furthermore, the tandem master cylinder 13 is connected to a reservoir 16. When a brake operating force is applied to the brake pedal 11, it is amplified by the booster 12 and transmitted to the tandem master cylinder 13. While the fluid pressure generated in one of the pressure generation chambers is applied to the wheel brake 14, 15, the fluid pressure generated in the other pressure generation chamber is applied to the other wheel brakes which are not shown.

To execute the automatic braking control and ABS control by adjusting the fluid pressure applied to the wheel brakes 14, 15, there is provided a fluid pressure system between the tandem master cylinder 13 and the wheel brakes 14, 15 and reservoir 16.

This fluid pressure control system includes first switching valves 17, 18, second switching valves 19, 20, a hydraulic pump 21, an inlet passage 22, a third switching valve 23, a fourth switching valve 24, a first orifice 25, a return passage 26, a second orifice 27, and a return passage switching valve 28. The first switching valves 17, 18 are normally open and designed to prevent the fluid from being supplied to the wheel brakes 14, 15 from the tandem master cylinder 13. The second switching valves 19,20 are normally closed and designed to bring the fluid supplied to the wheel brakes 14, 15 into the reservoir 16. The hydraulic pump 21 is driven by a drive source such that the fluid in the reservoir 16 is supplied to a passage between the tandem master cylinder 13 and the first switching valves 17, 18. The inlet of the hydraulic pump 21 is connected to the tandem master cylinder 13 through the inlet passage 22. The inlet passage 22 is provided with the third switching valve 23, which is normally closed. The fourth switching valve 24 is normally open and designed to shut off the fluid communication between the pressure generation chambers of the tandem master cylinder 13 and a circuit composed of the first and second switching valves 17–20 and the hydraulic pump 21. The outlet passage of the hydraulic pump 21 is provided with the first orifice 25. The outlet passage between the first orifice 25 and the hydraulic pump 21 is connected to the inlet passage of the hydraulic pump 21 through the return passage 26, which is provided with the second orifice 27 and the return passage switching valve 28. The switching valve 28 is normally closed and designed to selectively open or close the return passage 26. The first and second switching valves 17–20 constitute a fluid pressure control valve unit.

A damping chamber 29 and an orifice 30 are arranged in this order between the first orifice 25 and a passage connecting the first switching valves 17,18. The damping chamber 29 and the orifice 30 are used to prevent the fluid flowing into the tandem master cylinder 13 from pulsating. Furthermore, a check valve 34 is provided between the hydraulic pump 21 and a junction of the inlet passage 22 and the return passage 26, while another check valve 35 is provided between the first orifice 25 and the hydraulic pump 21. The check valves 34,35 prevent the fluid from flowing through the hydraulic pump 21 in a reversed direction. Furthermore, check valves 31, 32 are connected in parallel with the first and second switching valves 17,18 respectively. A check valve 33 is also connected in parallel with the switching valve 24. The check valve 33 allows fluid to flow from the tandem master cylinder 13 to the wheel brakes 14, 15 when the switching valve 24 is closed. A check valve 36 is further provided between the reservoir 16 and the junction of the inlet passage 22 and the return passage 26 to prevent fluid from flowing from the return passage 26 into the reservoir 16. The tandem master cylinder 13 has therein a master cylinder reservoir 37.

According to the fluid pressure control apparatus thus constructed, by depressing the brake pedal 11, a fluid pressure is generated in the tandem master cylinder 13 and applied to the wheel brakes 14,15. The fluid pressure applied to the wheel brake 14,15 is maintained by turning ON (closing) the first switching valves 17,18. If one of the wheels corresponding to the wheel brakes 14 or 15 tends to be locked, the fluid pressure applied thereto is reduced by turning ON (opening) the second switching valve 19 or 20 while keeping the first switching valve 17 or 18 tuned ON (closed) respectively. In this case, the pressure reduction is achieved by bringing the fluid in the corresponding wheel into the reservoir 16. Then, the fluid in the reservoir 16 is brought back into the tandem master cylinder 13 by driving the hydraulic pump 21 using the drive source. When the pressure reduction process has been terminated, the fluid pressure can be maintained at the same level by turning OFF the first switching valve 17 or 18 and the second switching valve 19 or 20 respectively.

When the brake pedal 11 is not depressed, by turning the third and fourth switching valves 23, 24 ON and driving the hydraulic pump 21, the fluid in the master cylinder reservoir 37 flows through the pressure generation chambers and the inlet passage 22 into the hydraulic pump 21. The fluid thus supplied to the hydraulic pump 21 then flows through the first orifice 25, the damping chamber 29, the orifice 30 and the first switching valves 17, 18 into the wheel brakes 14, 15, to which a fluid pressure having a predetermined gradient is applied. In this manner, the automatic braking control or TRC control is executed. The automatic braking control is executed, for example, to keep the vehicle away from a preceding vehicle by a certain distance. Furthermore, by opening the return passage switching valve 28, it is possible to impart a predetermined pressure increase gradient to the fluid pressure applied to the wheel brakes 14, 15. In this case, the pressure increase gradient is determined by the ratio of the fluid passage area of the first orifice 25 to that of the second orifice 27. When the return passage switching valve 28 is open, a fluid flows through the second orifice 27 and the return passage 26. Most of the fluid, in this case, circulates through the return passage 26. An additional fluid to be supplied to the wheel brakes 14,15 is fed.

It is noted herein that the inlet passage 22 may be connected to the master cylinder reservoir 37, as shown in FIG. 2 by a dotted line.

As hitherto described, the hydraulic pump can be used commonly for the automatic braking control and ABS control, thus eliminating the need to use an accumulator. Accordingly, the space required for the entire arrangement can be substantially reduced.

Figure 3:
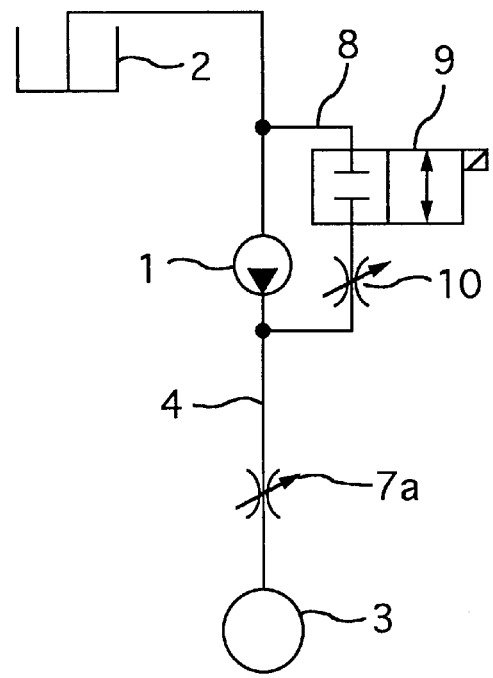
FIG. 3 is a circuit diagram showing another embodiment of the fluid pressure control apparatus according to the present invention.

According to another embodiment of the present invention as shown in FIG. 3, a first orifice 7*a* and the second orifice 10 are linear solenoid valves for controlling the fluid flow rate. In this case, the fluid passage areas of the first orifice 7*a* and the second orifice 10 can be set arbitrarily, thus allowing the fine adjustment of the pressure increase gradient. The effective braking force thus can be controlled precisely, which leads to a substantial improvement in the braking performances.

Figure 4:
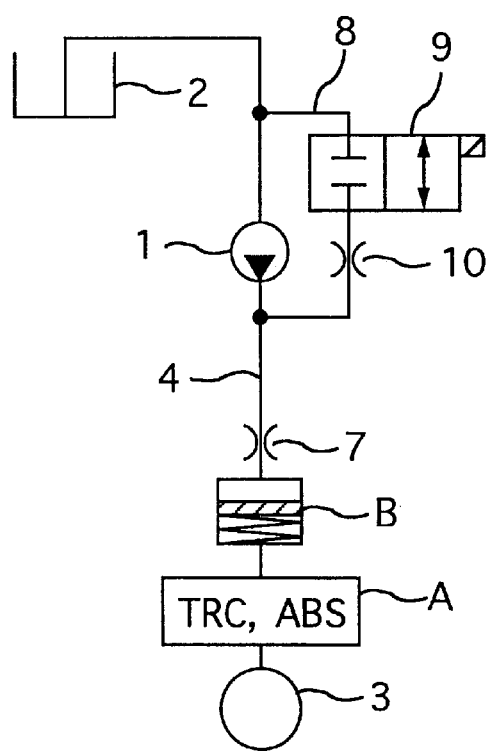
FIG. 4 is a circuit diagram showing still another embodiment of the fluid pressure control apparatus according to the present invention.

According to still another embodiment of the present invention, the fluid pressure control apparatus can be installed separately from the fluid pressure control circuit for ABS or TRC operation. As shown in FIG. 4, the fluid pressure control circuit A for ABS or TRC operation is connected to the fluid pressure control apparatus of the present invention through a floating piston type cylinder B.

As hitherto described, the fluid pressure control apparatus of the present invention is compact and easy to install in the vehicle. Furthermore, the fluid pressure control apparatus allows the pressure increase gradient to be adjusted finely and freely without necessitating any accumulator, thus meeting the requirements of the automatic braking process which is triggered, for example, to keep the vehicle away from a preceding vehicle by a certain distance.

While the present invention has been described with reference to what is presently considered to be preferred embodiments thereof, it is understood that the present invention is not limited to the disclosed embodiments or constructions. To the contrary, the present invention is intended to cover various modifications and equivalent arrangements included within the spirit and scope of the appended claims.

What is claimed is:

1. A fluid pressure control apparatus for wheel brakes, comprising:

a reservoir for holding hydraulic fluid;

a hydraulically operated wheel brake, the wheel brake and the reservoir being disposed on a hydraulic pressure supplying line extending between the wheel brake and the reservoir;

a hydraulic pump disposed on the hydraulic pressure supplying line for supplying hydraulic fluid in said reservoir to said wheel brake;

a first orifice provided on the hydraulic pressure supplying line between said wheel brake and said hydraulic pump;

a return passage extending from a point on the hydraulic pressure supplying line located between said first orifice and said hydraulic pump to a point on the hydraulic pressure supplying line located between said reservoir and said hydraulic pump;

a second orifice provided on said return passage; and a switching valve provided on said return passage downstream of said second orifice for selectively opening or closing the return passage, said switching valve closing said return passage to quickly increase a braking force to the wheel brake and opening said return passage to attenuate the braking force to the wheel brake.

2. A fluid pressure control apparatus for wheel brakes according to claim 1, wherein said first orifice and said second orifice are linear solenoid valves.

3. A fluid pressure control apparatus for wheel brakes according to claim 1 wherein, a fluid pressure control circuit for ABS or TRC operation is further comprised, said fluid pressure control circuit is disposed between said first orifice and said wheel brake.

4. A fluid pressure control apparatus for wheel brakes according to claim 3, wherein a cylinder having a floating piston is further comprised, said floating type cylinder is disposed between said first orifice and said fluid pressure control circuit for ABS or TRC operation.

5. A fluid pressure control apparatus for wheel brakes according to claim 1, wherein a master cylinder for generating a fluid pressure corresponding to a depressing force applied to a brake pedal and for supplying the fluid pressure to said wheel brake is further comprised.

6. A fluid pressure control apparatus for wheel brakes, comprising:

a hydraulically operated wheel brake;

a master cylinder for generating a fluid pressure corresponding to a depressing force applied to a brake pedal and supplying the fluid pressure to said wheel brake;

a fluid pressure control valve unit for shutting off the fluid pressure supply from said master cylinder to said wheel brake and for discharging the fluid pressure from the wheel brake into a reservoir;

a hydraulic pump for causing fluid to flow from said reservoir into a passage portion between said fluid pressure control valve unit and said master cylinder, said hydraulic pump being driven by a drive motor;

an inlet passage connecting an inlet of said hydraulic pump either to said master cylinder or to a master cylinder reservoir connected thereto;

a primary switching valve for selectively opening or closing said inlet passage;

a secondary switching valve provided between said master cylinder and said fluid pressure control valve unit, said secondary switching valve being located closer to said master cylinder than a passage portion into which a fluid discharged by said hydraulic pump flows;

a first orifice provided in a passage portion on the side of an outlet of said hydraulic pump;

a return passage connecting a passage portion between said first orifice and said hydraulic pump to a passage portion on the side of an inlet of said hydraulic pump;

a second orifice provided in said return passage; and a return passage switching valve for selectively opening or closing the return passage.

7. A fluid pressure control apparatus for wheel brakes according to claim 6, wherein said first orifice and said second orifice are linear solenoid valves.

8. A fluid pressure control apparatus for wheel brakes according to claim 6, wherein said reservoir into which fluid pressure from the wheel brake is discharged is a fluid reservoir, wherein said fluid pressure control valve comprises a first switching valve for selectively opening or closing the fluid pressure supply from said master cylinder to said wheel brake and a second switching valve for selectively closing or opening the fluid flow from the wheel brake into said fluid reservoir.

* * * * *